United States Patent
Blumer et al.

[11] Patent Number: 5,890,171
[45] Date of Patent: Mar. 30, 1999

[54] COMPUTER SYSTEM AND COMPUTER-IMPLEMENTED METHOD FOR INTERPRETING HYPERTEXT LINKS IN A DOCUMENT WHEN INCLUDING THE DOCUMENT WITHIN ANOTHER DOCUMENT

[75] Inventors: Thomas P. Blumer, Bellevue; Theodore Stefanik, Redmond, both of Wash.

[73] Assignee: Microsoft Corporation, Redmond, Wash.

[21] Appl. No.: 689,307

[22] Filed: Aug. 6, 1996

[51] Int. Cl.⁶ .................................................. G06F 17/21
[52] U.S. Cl. ......................................... 707/501; 707/513
[58] Field of Search .................................... 707/501, 513, 707/901, 906

[56] References Cited

U.S. PATENT DOCUMENTS

| | | | |
|---|---|---|---|
| 5,481,666 | 1/1996 | Nguyen et al. | 707/501 |
| 5,530,852 | 6/1996 | Meske, Jr. et al. | 707/501 |

OTHER PUBLICATIONS

Bortman, Henry. "Cyberdog." MacUser 12, No. 7 (Jul. 1996): 69.

Faucett, John W. and Robert W. Jepson. "Using the Common Gateway Interface." Unix Review 14, No. 5 (May 1996): 39.

*Primary Examiner*—Joseph H. Feild
*Assistant Examiner*—John L. Young
*Attorney, Agent, or Firm*—Ronald M. Anderson

[57] ABSTRACT

A method for rewriting document references such as URLs located in an included document, when an include operation is performed. The include operation may be performed by the server at any time, for example, when the including and included documents are stored on the server. One aspect of the invention is a process for inserting a second document into a first document, where the second document has a reference to a third document. The reference may be a link to the third document or may be an instruction to insert the third document. In this process, the second document is parsed to identify a relative reference to the third document with respect to the second document. An effective base reference for the second document is determined. In an HTML document, the effective base reference is the effective base URL. The relative reference to the third document is converted to an absolute reference using the determined effective base reference of the second document. An effective base reference for the first document is determined. The absolute reference to the third document is then converted to a new relative reference with respect to the first document, using the effective base reference of the first document. The second document is then inserted within the first document while replacing the relative reference to the third document with respect to the second document with the new relative reference to the third document with respect to the first document.

15 Claims, 5 Drawing Sheets

```
100
    DOCUMENT URL: HTTP://WWW.MICROSOFT.COM/FIGURE1.HTML

<HTML>
    <HEAD>
    <TITLE>FIGURE 1</TITLE>
    </HEAD>
    <BODY>
110 THE NEXT LINE HAS THE BASE ELEMENT.
    <BASE HREF=HTTP://WWW.ACME.COM/PRESS/RELEASE1.HTML>
120 THE NEXT LINE HAS A HYPERTEXT LINK WITH AN ABSOLUTE URL.
    <A HREF=HTTP://WWW.RESEARCH.COM/STATUS/REPORT.HTML>
130 THE NEXT LINE HAS A HYPERTEXT LINK WITH A RELATIVE URL.
    <A HREF=RELEASE2.HTML>
    </BODY>
    </HTML>
140
    THE RELATIVE URL REFERS TO: HTTP://WWW.ACME.COM/PRESS/RELEASE2.HTML
```

*FIG. 1*

```
200
    DOCUMENT URL: HTTP://WWW.MICROSOFT.COM/FIGURE2.HTML

<HTML>
    <HEAD>
    <TITLE>FIGURE 2</TITLE>
    </HEAD>
    <BODY>
    THIS DOCUMENT HAS NO BASE ELEMENT.
220 THE NEXT LINE HAS A HYPERTEXT LINK WITH AN ABSOLUTE URL.
    <A HREF=HTTP://WWW.RESEARCH.COM/STATUS/REPORT.HTML>
230 THE NEXT LINE HAS A HYPERTEXT LINK WITH A RELATIVE URL.
    <A HREF=RELEASE2.HTML>
    </BODY>
    </HTML>
240
    THE RELATIVE URL REFERS TO: HTTP://WWW.MICROSOFT.COM/RELEASE2.HTML
```

DOCUMENT URL: HTTP://WWW.MICROSOFT.COM/TEST1.HTM

```
<HTML>
<HEAD>
<TITLE>DOCUMENT TITLE TEST1.HTM</TITLE>
</HEAD>
<BODY>
DOCUMENT TEST1.HTM
250 <P>
<!--#INCLUDE VIRTUAL="/SUBDIR/INCLUDE1.HTM>
</BODY>
</HTML>
```

*FIG. 3A*

DOCUMENT URL: HTTP://WWW.MICROSOFT.COM/SUBDIR/INCLUDE1.HTM

```
DOCUMENT INCLUDE1.HTM
270 <P>
<A HREF="LINK.HTM">TEST PAGE</A>
```

*FIG. 3B*

COMPUTER SYSTEM AND COMPUTER-IMPLEMENTED METHOD FOR INTERPRETING HYPERTEXT LINKS IN A DOCUMENT WHEN INCLUDING THE DOCUMENT WITHIN ANOTHER DOCUMENT

FIELD OF THE INVENTION

This invention is related to the manipulation of electronic documents where one document may include the content of another document by reference. The invention is more particularly related to the processing of references such as hypertext links, found in a document that is inserted into another document.

BACKGROUND OF THE INVENTION

An on-line information system typically includes one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection.

Typical uses for on-line services include document viewing, electronic commerce, directory lookup, on-line classified advertisements, reference services, electronic bulletin boards, document retrieval, electronic publishing, keyword searching of documents, technical support for products, and directories of on-line services. The service may make the information available free of charge, or for a fee, and may he on publicly accessible or private computer systems.

Information sources managed by the server may include files, databases, and applications on the server system or on an external computer system. The information that the server provides may simply be stored on the server, may be converted from other formats manually or automatically, may be computed on the server in response to a client request, may be derived from data and applications on the server or other machines, or may be derived by any combination of these techniques.

The user of an on-line service uses a program on the client system to access the information managed by the on-line service. Possible user capabilities include viewing, searching, downloading, printing, editing, and filing the information managed by the server. The user may also price, purchase, rent, or reserve services or goods offered through the on-line service.

An on-line service for catalog shopping, which is an exemplary of application of this technology, might work as follows. A user running a program on a client system requests a connection to the catalog shopping service using a service name that either is well known or can be found in a directory. The request is received by the server employed by the catalog shopping service, and the server returns an introductory document that asks for an identifier and password. The client program displays this document, the user fills in an identifier and password that were assigned by the service in a previous visit, and the information is sent to the server. The server verifies the identifier and password against an authorization database, and returns a menu document that is then presented to the user. Each time the user selects a menu item, the selection is sent to the server, and the server responds with the appropriate new page of information, possibly including item descriptions or prices that are retrieved from a catalog database. By selecting a series of menu items, the user navigates to the desired item in the catalog and requests that the item be ordered. The server receives the order request, and returns a form to be completed by the user to provide information about shipping and billing. The user response is returned to the server, and the server enters the order information into an order database.

On-line services are available on the World Wide Web (WWW), which operates over the global Internet. The Internet interconnects a large number of otherwise unrelated computers or sites. Similar services are available on private networks called "Intranets" that may not be connected to the Internet, and through local area networks (LANs). The WWW and similar private architectures provide a "web" of interconnected document objects. On the WWW, these document objects are located at various sites on the global Internet. A more complete description of the WWW is provided in "The World-Wide Web," by T. Berners-Lee, R. Cailliau, A. Luotonen, H. F. Nielsen, and A. Secret, *Communications of the ACM,* 37 (8), pp. 76–82, August 1994, and in "World Wide Web: The Information Universe," by Berners-Lee, T., et al., in *Electronic Networking: Research, Applications and Policy,* Vol. 1, No. 2, Meckler, Westport, Conn., Spring 1992.

Among the types of document objects in an on-line service are documents and scripts. Documents that are published on the WWW are written in the Hypertext Markup Language (HTML). This language is described in HyperText Markup Language Specification—2.0, by T. Berners-Lee and D. Connolly, RFC 1866, proposed standard, November 1995, and in "World Wide Web & HTML," by Douglas C. McArthur, in *Dr. Dobbs Journal,* December 1994, pp. 18–20, 22, 24, 26 and 86. Many companies also are developing their own enhancements to HTML. HTML documents are generally static, that is, their contents do not change over time unless modified by a service developer. HTML documents can be created using programs specifically designed for that purpose or by executing a script file.

The HTML language is used for writing hypertext documents, which are more formally referred to as Standard Generalized Markup Language (SGML) documents that conform to a particular Document Type Definition (DTD). An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and for many other features.

The following lines of HTML, briefly illustrate how the language is used:

Some words are <B>bold</B>, others are <I>italic</I>.
  Here we start a new paragraph.<P>Here's a link to
  the <A HREF="http://www.microsoft.com">Microsoft
    Corporation </A> home page.

This sample document is a hypertext document because it contains a hypertext "link" to another document, in the line that includes "HREF=." The format of this link is described below. A hypertext document may also have a link to other parts of the same document. Linked documents may generally be located anywhere on the Internet. When a user is viewing the document using a client program called a Web browser (described below), the links are displayed as highlighted words or phrases. For example, using a Web browser, the sample document above might be displayed on the user's screen as follows:

Some words are bold, others are italic. Here we start a new paragraph.

Here's a link to Microsoft Corporation home page.

In the Web browser, the link may be selected, for example, by clicking on the highlighted area with a mouse. Typically, the screen cursor changes when positioned on a hypertext link. Selecting a link will cause the associated document to be displayed. Thus, clicking on the highlighted text "Microsoft Corporation" would fetch and display the associated home page for that entity.

The HTML language also provides a mechanism (the image or "IMG" element) enabling an HTML document to include an image that is stored as a separate file. When the end user views the HTML document, the included image is displayed as part of the document, at the point where the image element occurred in the document.

Another kind of document object in a web is a script. A script is an executable program, or a set of commands stored in a file, that can be run by a server program called a Web server (described below) to produce an HTML document that is then returned to the Web browser. Typical script actions include running library routines or other applications to fetch information from a file or a database, or initiating a request to obtain information from another machine, or retrieving a document corresponding to a selected hypertext link. A script may be run on the Web server when, for example, the end user selects a particular hypertext link in the Web browser, or submits an HTML form request. Scripts are usually written by a service developer in an interpreted language such as Basic, Practical Extraction and Report Language (Perl) or Tool Control Language (Tcl) or one of the Unix operating system shell languages, but they also may be written in more complex programming languages such as "C" and then compiled to produce an executable program. Programming in Tcl is described in more detail in *Tcl and the Tk Toolkit*, by John K. Ousterhout, Addison-Wesley, Reading, Mass., USA, 1994. Perl is described in more detail in *Programming in Perl*, by Larry Wall and Randal L. Schwartz, O'Reilly & Associates, Inc., Sebastopol, Calif., USA, 1992.

Each document object in a web has an identifier called a Universal Resource Identifier (URI). These identifiers are described in more detail in T. Berners-Lee, "Universal Resource Identifiers in WWW: A Unifying Syntax for the Expression of Names and Addresses of Objects on the Network as used in the World-Wide Web," RFC 1630, CERN, June 1994; and T. Berners-Lee, L,. Masinter, and M. McCahill, "Uniform Resource Locators (URL)," RFC 1738, CERN, Xerox PARC, University of Minnesota, December 1994. A URI allows any object on the Internet to be referred to by name or address, such as in a link in an HTML document as shown above. There are two types of URIs: a Universal Resource Name (URN), and a Uniform Resource Locator (URL). A URN references an object by name within a given name space. The Internet community has not yet defined the syntax of URNs. A URL references an object by defining an access algorithm using network protocols. An example of a URL is "http://www.microsoft.com". A URL, has the syntax "scheme://host:port/path?search" where "scheme" identifies the access protocol (such as HTTP, FTP or GOPHER);

"host" is the Internet domain name of the machine that supports the protocol;

"port" is the transmission control protocol (TCP) port number of the appropriate server (if different from the default);

"path" is a scheme-specific identification of the object; and

"search" contains optional parameters for querying the content of the object.

URLs are also used by web servers and browsers on private computer systems, Intranets, or networks, and not just for the WWW.

There are generally two types of URLs that may be used in the hypertext link: absolute URLs, and relative URLs. An absolute URL includes a protocol identifier, a machine name, and an optional HTTP port number. A relative URL does not include a protocol identifier, machine name or port, and must be interpreted relative to some known absolute URL called the base URL. The base URL is used to determine the protocol identifier, machine name, optional port and base directory for a relative URL. For further discussion of URL format and usage, see the document "Uniform Resource Locators", Internet Request for Comments (RFC) 1738, by T. Berners-Lee, L. Masinter, M. McCahill, University of Minnesota, December 1994. For further discussions of relative URL format and usage, see "Relative Uniform Resource Locators", RFC 1808, by R. Fielding, University of California, Irvine, June 1995.

A hypertext link to an electronic document is specified by one of several HTML elements. One of the parameters of an HTML, element for a hypertext link is the Uniform Resource Locator (URL) that serves as the identifier for the target of the link. An HTML, document may have a base element defining an absolute URL that specifies the base URL for that document. If the document has no base element, then the absolute URL of the document is used as the base URL. The base element provides a base address for interpreting relative URLs when the document is read out of context.

For example, FIG. 1 shows text with a document URL 100, a base element 110, a hypertext link with an absolute URL 120, and a hypertext link with a relative URL 130, which is evaluated with respect to base URL 110 to produce a resulting URL, 140. As an additional example, FIG. 2 shows text with a document URL 200, no base element, a hypertext link with an absolute URL 220, and a hypertext link with a relative URL 230, which is evaluated with respect to document URL 200 to produce a resulting URL 240.

A site at which documents are made available to network users is called a "Web site" and must run a "Web server" program to provide access to the documents. A Web server program is a computer program that allows a computer on the network to make documents available to the rest of the WWW or a private network. The documents are often hypertext documents in the HTML language, but may be other types of document objects as well, and may include images, audio, and/or video information. The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc II™ workstation running the Unix operating, system, and personal computers with the Intel PENTIUM™ processor running the Microsoft MS-DOS™ operating system and the Microsoft Windows™ operating environment.

Web servers also have a standard interface for running external programs, called the Common Gateway Interface (CGI). CGI is described in more detail in *How to Set Up and Maintain a Web Site,* by Lincoln D. Stein, Addison-Wesley, August 1995. A gateway is a program that handles incoming information requests and returns the appropriate document or generates a document dynamically. For example, a gateway might receive queries, look up the answer in a database to provide a response, and translate the response into a page of HTML so that the server can send the response to the client. A gateway program may be written in a language such as "C" or in a scripting language such as Perl or Tcl or one of the Unix operating system shell languages. The CGI standard specifies how the script or application receives input and parameters, and specifies how output should be formatted and returned to the server.

For security reasons, a Web server machine may limit access to files. To control access to files on the Web server, the Web server program running on the server machine may provide an extra layer of security above and beyond the normal file system and login security procedures of the operating system on the server machine. The Web server program may add further security rules such as: (a) optionally requiring input of a user name and password, completely independent of the normal user name and passwords that the operating system may maintain on user accounts; (b) allowing groups of users to be identified for security purposes, independent of any user group definitions of the operating system; (c) access control for each document object such that only specified users (with optional passwords) or groups of users are allowed access to an object, or so that access is only allowed for clients at specific network addresses, or some combination of these rules; (d) allowing access to the document objects only through a specified subset of the possible HTTP methods; and (e) allowing some document objects to be marked as HTML, documents, others to be marked as executable scripts that will generate HTML documents, and others to be marked as other types of objects such as images. Access to the on-line service document objects via a network file system would not conform to the security features of the Web server program and would provide a way to access documents outside of the security provided by the Web server. The Web server program also typically maps document object names that are known to the client to file names on the server file system. This mapping may be arbitrarily complex, and any author or program that tries to access documents on the Web server directly would need to understand this name mapping.

A user (typically using a machine other than the machine used by the Web server) who wishes to access documents available on the network at a Web site must run a client program called a "Web browser." The combination of the Web server and Web browser communicating using an HTTP protocol over a computer network is referred to herein as a "web architecture." The Web browser program allows the user to retrieve and display documents from Web servers. Some of the popular Web browser programs are: Navigator™ browser from NetScape Communications Corp., of Mountain View, Calif.; Mosaic™ browser from the National Center for Supercomputing Applications (NCSA); Win-Web™ browser, from Microelectronics and Computer Technology Corp. of Austin, Tex.; and Internet Explorer™ from Microsoft Corporation of Redmond, Wash. Web browsers have been developed to run on different platforms, including personal computers with the Intel Corporation PENTIUM™ processor running Microsoft Corporation's MS-DOS™ operating system and Microsoft Corporation's Windows™ environment, and Apple Corporation's Macintosh™ personal computers.

The Web server and the Web browser communicate using the Hypertext Transfer Protocol (HTTP) message protocol and the underlying transmission control protocol/Internet protocol (TCP/IP) data transport protocol of the Internet. HTTP is described in Hypertext Transfer Protocol—HTTP/1.0, by T. Berners-Lee, R. T. Fielding, H. Frystyk Nielsen, Internet Draft Document, Oct. 14, 1995, and is currently in the standardization process. In HTTP, the Web browser establishes a connection to a Web server and sends an HTTP request message to the server. In response to an HTTP request message, the Web server checks for authorization, performs any requested action, and returns an HTTP response message containing an HTML document in accord with the requested action, or an error message. The returned HTML document may simply be a file stored on the Web server, or may be created dynamically using a script called in response to the HTTP request message. For instance, to retrieve a document, a Web browser may send an HTTP request message to the indicated Web server, requesting a document by reference to the URL of the document. The Web server then retrieves the document and returns it in an HTTP response message to the Web browser. If the document has hypertext links, then the user may again select one of the links to request that a new document be retrieved and displayed. As another example, a user may fill in a form requesting a database search. In response, the Web browser will send an HTTP request message to the Web server including the name of the database to be searched, the search parameters, and the URL of the search script. The Web server calls a search program, passing in the search parameters. The program examines the parameters and attempts to answer the query, perhaps by sending the query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) specification defines a standardized protocol for describing the content of messages that are passed over a network. HTTP request and response messages use MIME header lines to indicate the format of the message. MIME is described in more detail in MIME (Multipurpose Internet Mail Extensions): Mechanisms for Specifying and Describing the Format of Internet Message Bodies, Internet RFC 1341, June 1992.

One of the problems with the HTML language is that there is no general facility for one HTML document to include a second HTML document, except when the second document is a graphical image. It is important to solve this problem, because it is often convenient, e.g., when managing large and complex web sites, to have the capability to include one document as part of another document. This feature allows a document fragment commonly used in many pages within a web to reside in one place for easy maintenance. For example, there may be a document fragment comprising a copyright notice, which should be included in each document on the Web site. If the copyright notice must be changed, the change can be made in one place without having to change every occurrence of the copyright notice on all of the pages on which it is included. Additionally, a file providing a navigation bar, or, a combination of images and links to corresponding documents, is easily maintained in the same way.

One solution to this problem is an include facility that is built-in to the Web server. Several HTTP servers, including the public domain National Center for Supercomputing Applications (NCSA) server, a public domain server from Apache, and a commercially available server from Netscape, Inc., use this approach. The process performed by such an include facility is shown in FIG. 6. Instead of just returning the requested HTML document to the client, these servers have an option to parse an HTML document, interpret commands within the document, and return a new HTML document to the client based on the results of those commands. One of the possible commands is a request that the server include a second HTML document at the location of the include command. This solution works for included documents that include other documents, to any level of recursion. In particular, the process of FIG. 6 involves parsing an input document in a step 300. While reading and parsing the input document, the following steps are recursively performed until an end of the file is reached, as indicated in a step 302, after which, the include process or the recursive call thereto is terminated in a step 301. First, the program reads a token from the input document (step 300); for an HTML document, a token is either an HTML tag, an include directive in the form of an HTML comment, some other HTML comment, or a string of text without HTML tags. If as determined in a step 304, the token is an include directive specifying that a second document should be included in the current location, then the included document is recursively processed according to the procedure described in FIG. 6, at a step 314. During the processing of the included document, results are copied to the output document. The processing of the included document is primarily to determine only if other documents are included therein. If the token is not an include directive, processing continues with a step 308, which provides for copying the token to the output document.

One problem with using the server side include facility to include one HTML document within another is that in currently available servers with this capability, the relative URLs within the included document are not properly adjusted to reflect the new environment of the including document. The final HTML document produced by the server contains the text of the original document and the included text, but the relative URLs in the included text have not been modified correctly to indicate the new document location. The included text is simply copied into the including document without any modifications.

For example, FIG. 3A shows a document "test1.htm," which is intended to be used with the NCSA 1.5 server side include facility. It has a document URL 260. This document includes, via an include directive 250, a second document, "subdir/include1.htm," shown in FIG. 3B. The second document contains a fragment of HTML, and the fragment contains a hypertext link 270 to a third document, "link.htm." When the client requests document test1.htm and if the server determines that the server side include facility is operating, the server makes a copy of document test1.htm and replaces the include directive with the contents of the included document. The resulting document is then returned to the client. Since the implementation of the server side include facility simply copies the included document without rewriting the relative URLs contained in the included document, the resulting document has a relative URL for "link.htm" that is incorrect. The URL, for link.htm is now interpreted relative to the including document, to give an absolute URL of http://www.microsoft.com/link.htm, whereas the original interpretation of the URL for link.htm was relative to the included document giving the absolute URL http://www.microsoft.com/subdir/link.htm. Therefore when the client receives the resulting document "test1.htm," and the user attempts to use the hypertext link to the document "link.htm," the link will incorrectly point to the wrong location.

The above example illustrates one problem with the server side include facility. If the including document and the included document reside in different directories on the server, and if neither document has a base element for the base URL, then the relative URLs in the included document will be incorrectly interpreted in the resulting document.

In general, the including document and the included document each have an effective base URL, which is established by a base element in the document, or if there is no base element, is set to the absolute URL of the document. A more general statement of the problem is that if the including document and the included document have different effective base URLs, then the relative URLs in the included document will be incorrectly interpreted in the resulting document.

Another possible solution to the problem of having one HTML document include another HTML document is to have the server execute a program through the CGI mechanism. The program parses the including document, replacing any include directives with the included documents. However, this solution suffers from the same problem, namely that a straightforward copy of the included documents into the resulting document yields incorrect results for relative URLs in the included document.

SUMMARY OF THE INVENTION

The present invention overcomes these problems in the prior art by rewriting document references, such as a URL, located in an included document, when the include operation is performed. This approach identifies references in the included document that are relative to the included document, converts them to absolute references, and then converts them to references that are relative to the including document. The include operation may be performed by the server at any time, for example, when a user requests viewing the including document, or at any time prior to that point. For example, the include operation may be performed when the including and included documents are stored on the server.

Accordingly, one aspect of the invention is a process for inserting a second document into a first document, where the second document has a reference to a third document. The reference may be a link to the third document or may be an instruction to insert the third document. The second document may have several of such references to different documents. In this process, the second document is parsed to identify a relative reference to the third document with respect to the second document. An effective base reference for the second document is determined. In an HTML document, the effective base reference is the effective base URL. The relative reference to the third document is converted to an absolute reference using the determined effective base reference of the second document. An effective base reference for the first document is determined. The absolute reference to the third document is then converted to a new relative reference with respect to the first document, using the effective base reference of the first document. The second document is then inserted within the first document, while replacing the relative reference to the third document with respect to the second document with the new relative reference to the third document with respect to the first document.

Another aspect of the invention is a computer system for inserting a second document within a first document, wherein the second document has a reference to a third document. The reference may be a link to the third document or may be an instruction to insert the third document. The second document may have several such references to different documents. The computer system includes a mechanism for parsing the second document to identify a relative reference to the third document with respect to the second document. An effective base reference for the second document is determined. In an HTML document, the effective base reference is the effective base URL. A mechanism converts the relative reference to the third document to an absolute reference using the determined effective base reference of the second document. An effective base reference for the first document is also determined. A mechanism converts the absolute reference to the third document to a new relative reference with respect to the first document, using the effective base reference of the first document. Finally, the system inserts the second document within the first document while replacing the relative reference to the third document with respect to the second document with the new relative reference to the third document with respect to the first document.

Another aspect of the invention is a computer program product that can be used to insert a second document within a first document, wherein the second document has a reference to a third document. The reference may be a link to the third document or may be an instruction to insert the third document. The second document may have several such references to different documents. The computer program product includes a computer readable medium. Computer program logic is recorded on the computer readable medium in computer readable form. The computer program logic is executable by a computer to define a mechanism for parsing the second document to identify a relative reference to the third document with respect to the second document. Logic defining another mechanism is stored for determining effective base references for the first and second documents. Logic defining yet another mechanism converts the relative reference to the third document to an absolute reference, using the determined effective base reference of the second document. Another mechanism converts the absolute reference to the third document to a new relative reference with respect to the first document, using the effective base reference of the first document. The second document, by another mechanism, is inserted within the first document, and the relative reference to the third document with respect to the second document is replaced by the new relative reference to the third document with respect to the first document.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a sample HTML document with a base URL, and with a hyperlink using a relative URL, and a hyperlink using an absolute URL;

FIG. 2 is a sample HTML document without a base URL, and with a hyperlink using a relative URL, and a hyperlink using an absolute URL;

FIGS. 3A–3B are sample HTML documents designed to be used with an include facility of an HTTP server, where 3A shows an including document and 3B shows an included document;

DETAILED DESCRIPTION OF THE PREFERRED EMBODIMENTS

All references cited within this document are hereby expressly incorporated herein by reference. The present invention solves the problem of providing correct document references, e.g., hypertext links, such as URLs from an included document to some other document, by rewriting relative document references in the included document during the include process.

Figure 7:
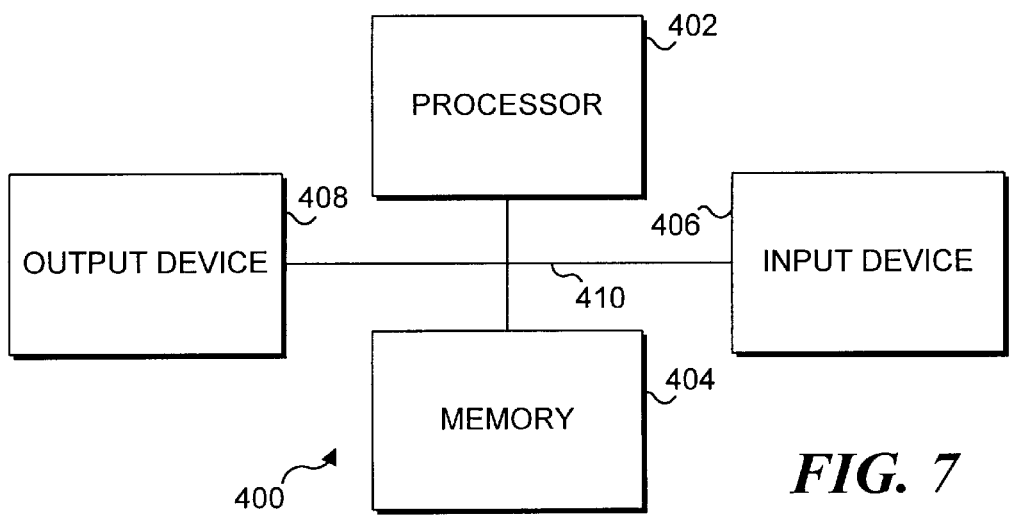
FIG. 7 is a block diagram of a computer system with which the present invention may be used.

The present invention is practiced on a computer system 400, such as shown in FIG. 7. Computer system 400, which is generally conventional in design, includes a processor 402 connected to a memory 404 via an interconnection mechanism 410. The interconnection mechanism also connects the processor and memory to an input device 406 and an output device 408. The interconnection mechanism may be a bus, cross-point switch, or other type of communication path. Computer system 400 may, for example, comprise a personal computer using a PENTIUM™ processor, from Intel Corporation. Memory 404 generally includes one or more non-volatile storage devices, such as a hard drive and a Read Only Memory (ROM), as well as a volatile random access storage medium, such as Random Access Memory (RAM). Input devices 406 include a pointer device such as a mouse, tablet, or a track ball, and other devices, such as a keyboard. The output device may include one or more printers and display devices, such as Liquid Crystal Displays (LCDs) and Cathode Ray Tube (CRT) displays. It should be understood that the particular computer system used to implement computer system 400 is not limiting of the present invention and that details of the computer system need not be fully disclosed herein to enable one of ordinary skill in the art to understand the present invention. It should also be understood that computer system 400 may be connected to other computers through a network (not shown). The interconnection may be made via the Internet, wherein computer system 400 acts as an HTTP server, which is accessible to other computers via client programs such as a Web Browser or authoring tool.

Figure 4:
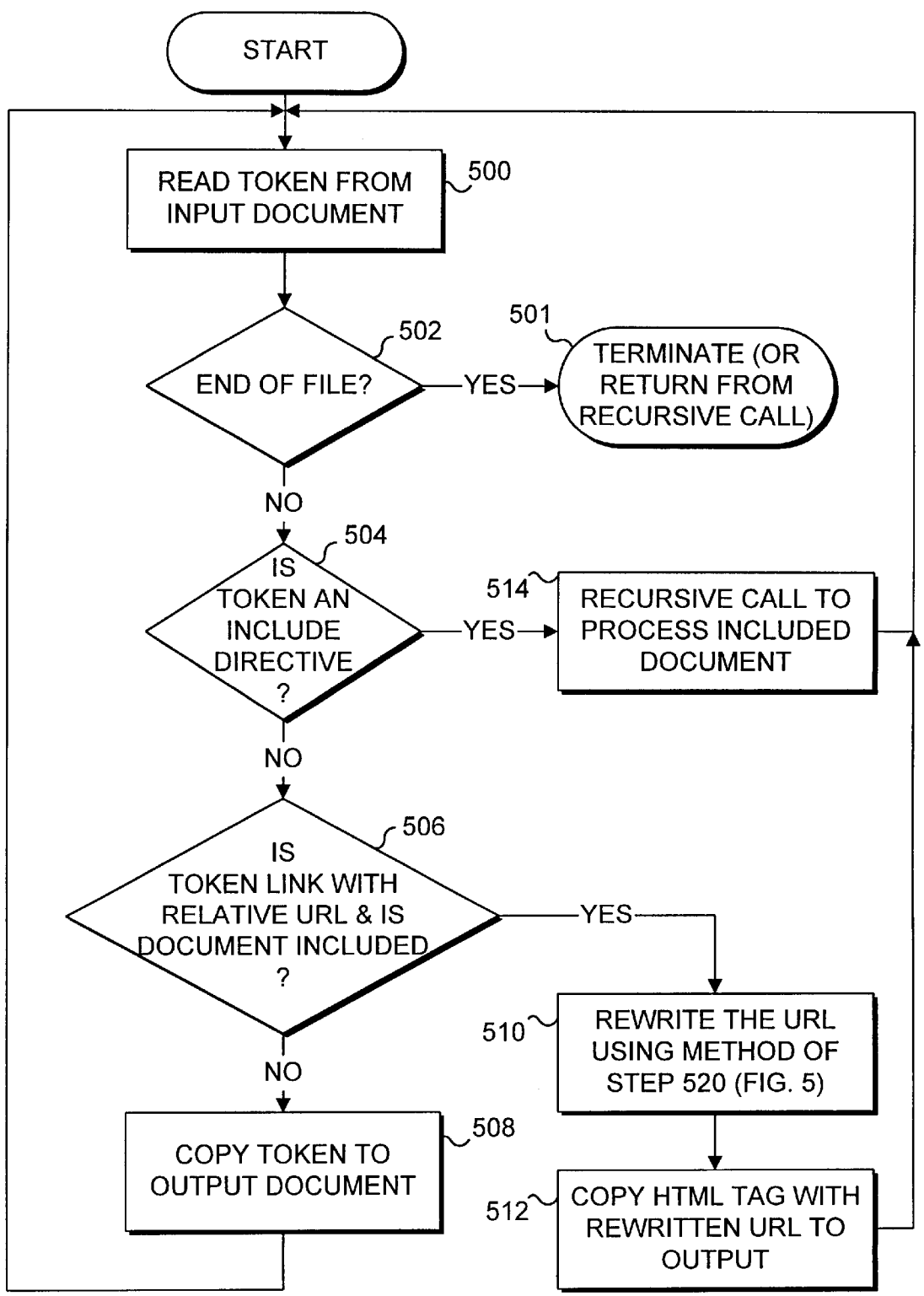
FIG. 4 is a flowchart describing how an include facility in accordance with the present invention operates.

The process of including one document within another involves the steps shown in FIG. 4. In this process, the document is read and its contents are parsed to write a new version of the document, called the static document. In the static document, any include directives are expanded by copying in the included document. While reading and parsing the input document, the process recursively performs the following steps until an end of file is reached, as indicated in a step 502. Thereafter, the include process or the recursive call thereto is terminated in a step 501. First, the program reads a token from the input document (step 500), where, for an HTML document, a token is either an HTML tag, an include directive in the form of an HTML comment, some other HTML comment, or a string of text without HTML tags. If, as determined in a step 504, the token is an include directive specifying that a second document should be included at the current location, then the included document is recursively processed according to the process described in FIG. 4, as indicated in a step 514. In this case, the include directive does not yet result in copying the included document to the output document. Instead, during the processing of the included document, results are copied to the output document.

If the token is not an include directive, processing continues with a step 506. If the token is an HTML tag that specifies a hypertext link, if the link uses a relative URL, and if the document is being processed because it is included in another document, as determined in step 506, then the relative URL is rewritten in a step 510, which is described in more detail in FIG. 5. The HTML tag with the rewritten URL is then copied to the output document in a step 512. If the token does not fall into one of the above cases, then the token is copied to the output document in a step 508.

The process illustrated in FIG. 4 is recursive, and thus is applicable to included documents, which themselves include other documents, to any level of recursion. For example, the process will work for processing a document that includes a second document, where the second document includes a third document, and so forth.

Figure 5:
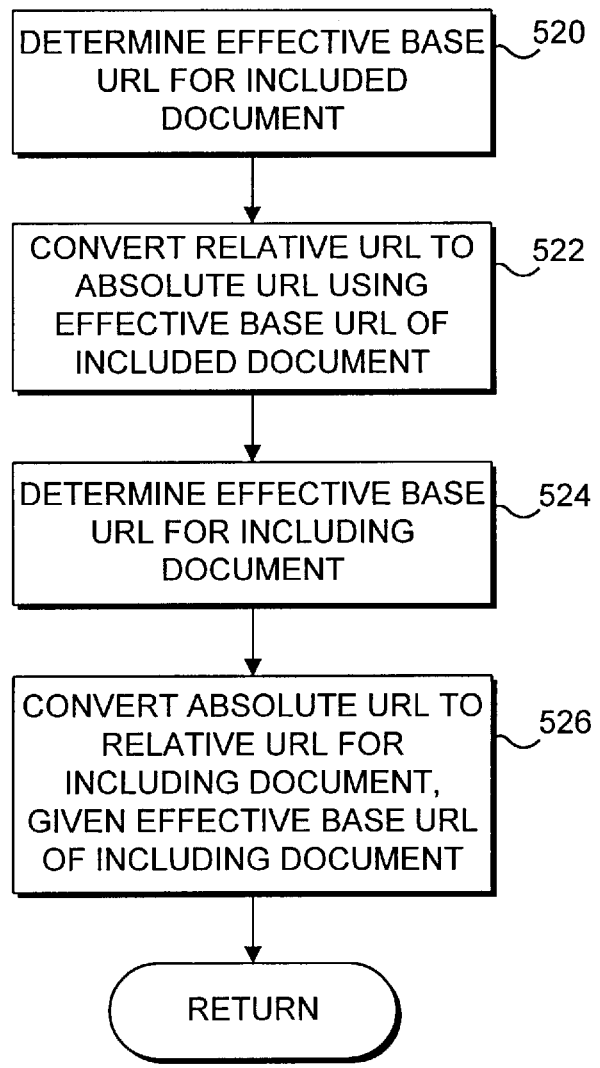
FIG. 5 is a flowchart describing how a URL is rewritten using the present invention.
Figure 6:
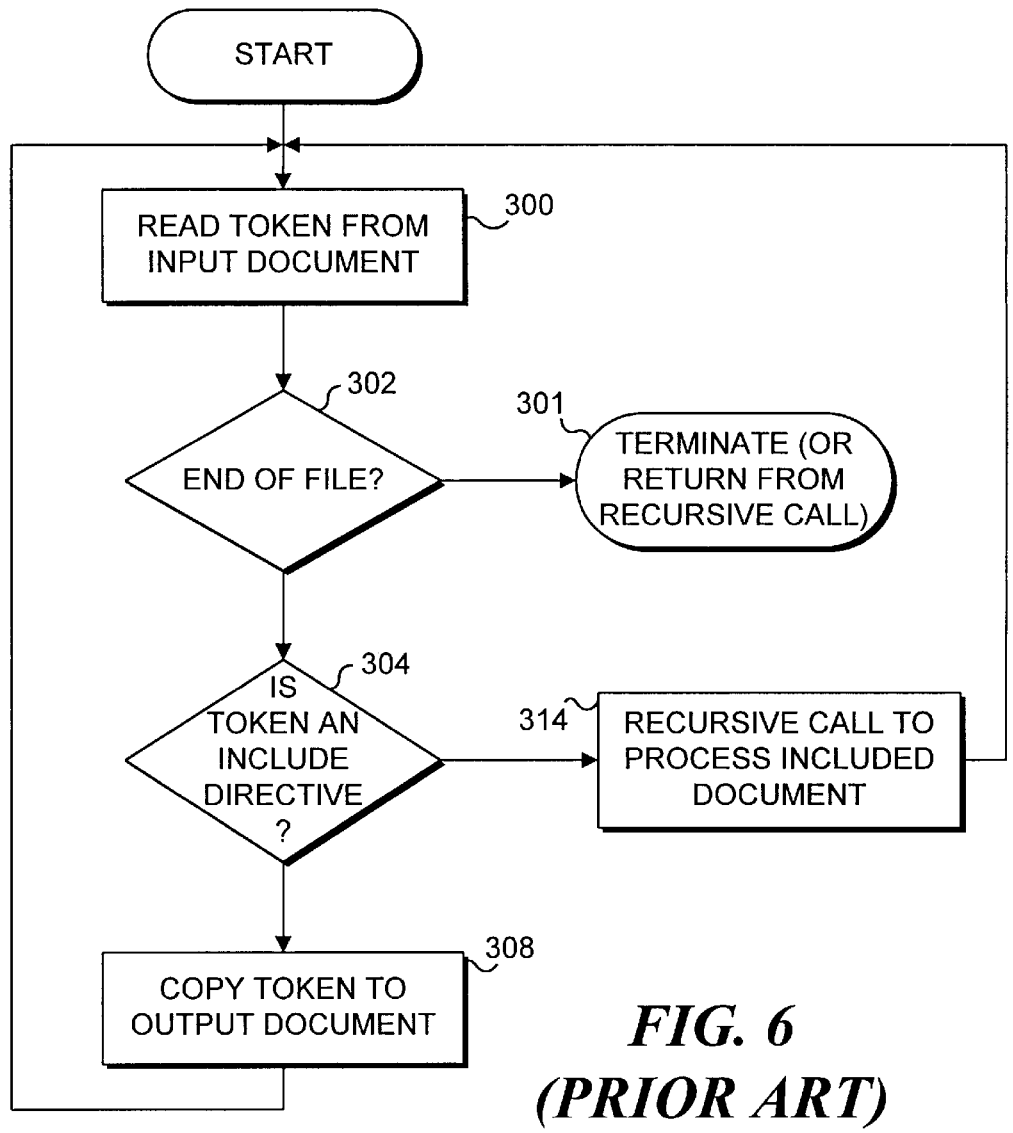
FIG. 6 is a flowchart describing how an include facility of an HTTP server operates.

FIG. 5 shows the process of step 510, which provides for rewriting a relative URL within an included document in more detail, starting in a step 520, where the program determines an effective base URL for the included document. If the included document has a base element, then the effective base URL is the absolute URL given in the base element. If the included document has no base element, then the effective base URL, is the absolute URL of the included document. Next, in a step 522, the program converts the relative URL to an absolute URL, using the effective base URL of the included document. In a step 524, the effective base URL for the including document is determined. If the including document has a base element, then the effective base URL is the absolute URL, given in the base element. If the including document has no base element, then the effective base URL, is the absolute URL of the including document. Finally, in a step 526, the absolute URL, produced in step 522 is converted to a relative URL that is appropriate for the including document, given the effective base URL, of the including document.

The process described in FIGS. 4 and 5 recursively processes documents included in other documents, to an arbitrary level of nesting, in order to rewrite any number of relative references included in the documents. This process eliminates errors created by other include facilities, which merely copy included documents without rewriting any relative references found within the included documents. This process improves and simplifies the tasks involved in document management and in maintaining and debugging hypertext systems.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A process for inserting a second document into a first document, wherein the second document has a reference to a third document, comprising the steps of:
    (a) parsing the second document to identify a relative reference to the third document with respect to the second document;
    (b) determining an effective base reference for the second document;
    (c) converting the relative reference to the third document to an absolute reference using the determined effective base reference for the second document;
    (d) determining an effective base reference for the first document;
    (e) converting the absolute reference to the third document to a new relative reference with respect to the first document, using the effective base reference of the first document; and
    (f) inserting the second document within the first document while replacing the relative reference to the third document with respect to the second document with the new relative reference to the third document with respect to the first document.

2. The process of claim 1, wherein the reference to the third document is a hypertext link.

3. The process of claim 1, wherein the second document has a reference to a fourth document, further comprising the steps of:
    (a) parsing the second document to identify a relative reference to the fourth document with respect to the second document;
    (b) converting the relative reference to the fourth document to an absolute reference using the determined effective base reference of the second document;
    (c) converting the absolute reference to the fourth document to a new relative reference with respect to the first document, using the effective base reference of the first document; and
    (d) inserting the second document within the first document while replacing the relative reference to the fourth document with respect to the second document with the new relative reference to the fourth document with respect to the first document.

4. A computer system for inserting a second document into a first document, wherein the second document has a reference to a third document, comprising:
    (a) means for parsing the second document to identify a relative reference to the third document with respect to the second document;
    (b) means for determining an effective base reference for the second document;
    (c) means for converting the relative reference to the third document to an absolute reference using the determined effective base reference of the second document;
    (d) means for determining an effective base reference for the first document;
    (e) means for converting the absolute reference to the third document to a new relative reference with respect to the first document, using the effective base reference of the first document; and (f) means for inserting the second document within the first document while replacing the relative reference to the third document with respect to the second document with the new relative reference to the third document with respect to the first document.

5. The computer system of claim 4, wherein the reference to the third document is a hypertext link.

6. The computer system of claim 4, wherein the second document has a reference to a fourth document, further comprising:
 (a) means for parsing the second document to identify a relative reference to the fourth document with respect to the second document;
 (b) means for converting the relative reference to the fourth document to an absolute reference using the determined effective base reference of the second document;
 (c) means for converting the absolute reference to the fourth document to a new relative reference with respect to the first document, using the effective base reference of the first document; and
 (d) means for inserting the second document within the first document while replacing the relative reference to the fourth document with respect to the second document with the new relative reference to the fourth document with respect to the first document.

7. A computer program product for inserting a second document into a first document, wherein the second document has a reference to a third document, comprising:
 (a) a computer readable medium; and
 (b) computer program logic recorded on the computer readable medium in computer readable form, wherein the computer program logic is executable by a computer to define:
  (i) means for parsing the second document to identify a relative reference to the third document with respect to the second document;
  (ii) means for determining an effective base reference for the second document;
  (iii) means for converting the relative reference to the third document to an absolute reference using the determined effective base reference of the second document;
  (iv) means for determining an effective base reference for the first document;
  (v) means for converting the absolute reference to the third document to a new relative reference with respect to the first document, using the effective base reference of the first document; and
  (vi) means for inserting the second document within the first document while replacing the relative reference to the third document with respect to the second document with the new relative reference to the third document with respect to the first document.

8. The computer program product of claim 7, wherein the reference to the third document comprises a hypertext link.

9. The computer program product of claim 7, wherein the second document includes a reference to a fourth document, the computer program logic further defining:
 (a) means for parsing the second document to identify a relative reference to the fourth document with respect to the second document;
 (b) means for converting the relative reference to the fourth document to an absolute reference using the determined effective base reference of the second document;
 (c) means for converting the absolute reference to the fourth document to a new relative reference with respect to the first document, using the effective base reference of the first document; and
 (d) means for inserting the second document within the first document while replacing the relative reference to the fourth document with respect to the second document with the new relative reference to the fourth document with respect to the first document.

10. A process for inserting a second document into a first document, wherein the second document has a reference to a third document, comprising the steps of:
 (a) parsing the second document to identify a relative reference to the third document with respect to the second document;
 (b) determining an effective base reference for the second document;
 (c) converting the relative reference to the third document to a different reference using the determined effective base reference for the second document;
 (d) determining an effective base reference for the first document;
 (e) converting said different reference to the third document to a new relative reference with respect to the first document, using the effective base reference of the first document; and
 (f) accessing the second document when processing the first document, by replacing the relative reference to the third document with respect to the second document with the new relative reference to the third document with respect to the first document.

11. A process for inserting a second document into a first document, wherein the second document has a reference to a third document, comprising the steps of:
 (a) parsing the second document to identify a relative reference to the third document with respect to the second document;
 (b) determining an effective base reference for the second document;
 (c) converting the relative reference to the third document to an absolute reference using the determined effective base reference for the second document;
 (d) accessing the second document when processing the first document, and replacing the relative reference to the third document with respect to the second document with the absolute reference to the third document.

12. A computer system for inserting a second document into a first document, wherein the second document has a reference to a third document, comprising:
 (a) means for parsing the second document to identify a relative reference to the third document with respect to the second document;
 (b) means for determining an effective base reference for the second document;
 (c) means for converting the relative reference to the third document to a different reference using the determined effective base reference for the second document;
 (d) means for determining an effective base reference for the first document;
 (e) means for converting the different reference to the third document to a new relative reference with respect to the first document, using the effective base reference of the first document; and
 (f) means for accessing the second document when processing the first document, by replacing the relative reference to the third document with respect to the second document with the new relative reference to the third document with respect to the first document.

13. A computer system for inserting a second document into a first document, wherein the second document has a reference to a third document, comprising:
   (a) means for parsing the second document to identify a relative reference to the third document with respect to the second document;
   (b) means for determining an effective base reference for the second document;
   (c) means for converting the relative reference to the third document to an absolute reference using the determined effective base reference for the second document;
   (d) means for accessing the second document when processing the first document, and replacing the relative reference to the third document with respect to the second document with the absolute reference to the third document.

14. A computer program product for inserting a second document into a first document, wherein the second document has a reference to a third document, comprising:
   (a) a computer readable medium; and
   (b) computer program logic recorded on the computer readable medium in computer readable form, wherein the computer program logic is executable by a computer to define:
      (i) means for parsing the second document to identify a relative reference to the third document with respect to the second document;
      (ii) means for determining an effective base reference for the second document;
      (iii) means for converting the relative reference to the third document to a different reference using the determined effective base reference for the second document;
      (iv) means for determining an effective base reference for the first document;
      (v) means for converting the different reference to the third document to a new relative reference with respect to the first document, using the effective base reference of the first document; and
      (vi) means for accessing the second document when processing the first document, by replacing the relative reference to the third document with respect to the second document with the new relative reference to the third document with respect to the first document.

15. A computer program product for inserting a second document into a first document, wherein the second document has a reference to a third document, comprising:
   (a) a computer readable medium; and
   (b) computer program logic recorded on the computer readable medium in computer readable form, wherein the computer program logic is executable by a computer to define:
      (i) means for parsing the second document to identify a relative reference to the third document with respect to the second document;
      (ii) means for determining an effective base reference for the second document;
      (iii) means for converting the relative reference to the third document to an absolute reference using the determined effective base reference for the second document; and
      (iv) means for accessing the second document when processing the first document, and replacing the relative reference to the third document with respect to the second document with the absolute reference to the third document.

* * * * *